United States Patent [19]

Belmares-Sarabia et al.

[11] Patent Number: 4,862,251

[45] Date of Patent: Aug. 29, 1989

[54] COLOR CORRECTION SYSTEM AND METHOD

[75] Inventors: Armand Belmares-Sarabia, Catskill, N.Y.; Stanley J. Chayka, Parsippany, N.J.

[73] Assignee: Corporate Communications Consultants, Inc., Fairfield, N.J.

[21] Appl. No.: 248,349

[22] Filed: Sep. 22, 1988

Related U.S. Application Data

[63] Continuation of Ser. No. 851,164, Apr. 14, 1986, abandoned, which is a continuation-in-part of Ser. No. 598,468, Apr. 9, 1984, Pat. No. 4,679,067.

[51] Int. Cl.$^4$ .................. H04N 9/68; H04N 9/73; H04N 9/75; H04N 9/74
[52] U.S. Cl. ........................... 358/22; 358/27; 358/28; 358/80
[58] Field of Search .................. 358/22, 27, 28, 80

[56] References Cited

U.S. PATENT DOCUMENTS

| | | |
|---|---|---|
| 3,255,305 | 6/1966 | Chatten . |
| 3,560,638 | 2/1971 | Skrydstrup et al. . |
| 3,737,564 | 6/1973 | Bruinsma . |
| 3,959,813 | 5/1976 | Legler . |
| 4,051,520 | 9/1977 | Davidse et al. . |
| 4,109,278 | 8/1978 | Mendrala et al. . |
| 4,149,185 | 4/1979 | Weinger . |
| 4,236,174 | 11/1980 | Gall . |
| 4,258,385 | 3/1981 | Greenberg et al. . |
| 4,285,005 | 8/1981 | Srivastava ............... 358/28 |
| 4,296,432 | 10/1981 | Engel et al. ............. 358/28 |
| 4,386,363 | 5/1983 | Morrison . |
| 4,396,939 | 8/1983 | Kitahama . |
| 4,500,919 | 2/1985 | Schreiber . |
| 4,525,736 | 6/1985 | Korman . |
| 4,533,938 | 8/1985 | Hurst . |
| 4,642,682 | 2/1987 | Orsburn et al. . |

FOREIGN PATENT DOCUMENTS

| | | | |
|---|---|---|---|
| 172082 | 10/1983 | Japan | 358/22 |
| 60559 | 4/1984 | Japan | 358/22 |
| 124189 | 7/1985 | Japan | 358/22 |
| 930749 | 5/1982 | U.S.S.R. | 358/22 |

Primary Examiner—John W. Shepperd
Attorney, Agent, or Firm—Curtis, Morris & Safford

[57] ABSTRACT

A color correction system and method are disclosed. A color corrector may include circuits for selecting a predetermined range of colors around an infinitely selectable principal color and circuits for selectively generating color corrections for the video picture signals which correspond to the predetermined range of colors. The color corrections are then applied to the video picture signals to produce color corrected video picture signals. The color corrections may be stored and recalled on a scene-by-scene basis. Two or more such circuits may be employed so that two or more different principal colors can be selected. Preferably, the predetermined range of colors is adjustable. A color corrector may also include circuits for storing and recalling area discrimination signals on a scene-by-scene basis. Moreover, a color corrector may include circuits for identifying the color corrections for a particular scene with a video picture from that particular scene. The video picture for the particular scene is displayed, and the operator may recall the color corrections by using the video picture together with an associated control.

19 Claims, 10 Drawing Sheets

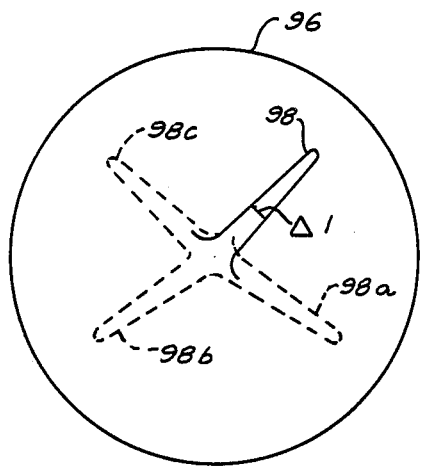 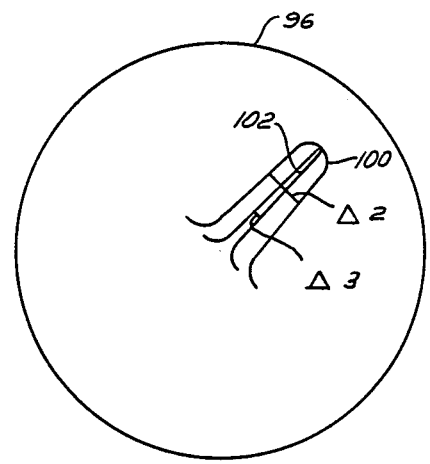
5 A         5 B
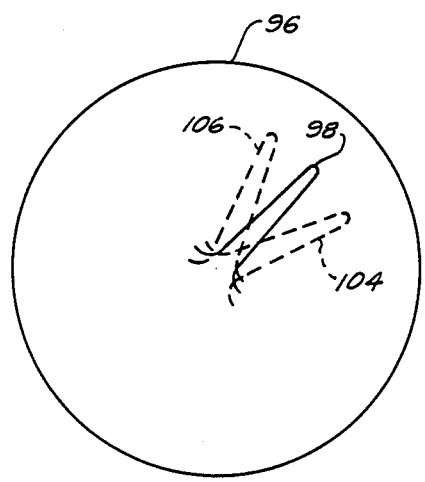 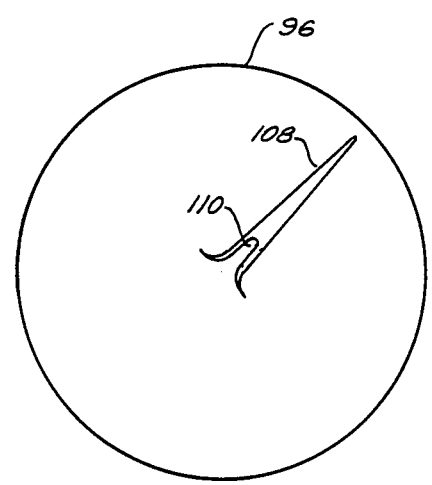
5 C         5 D
FIG. 5

TO FIG. 7B

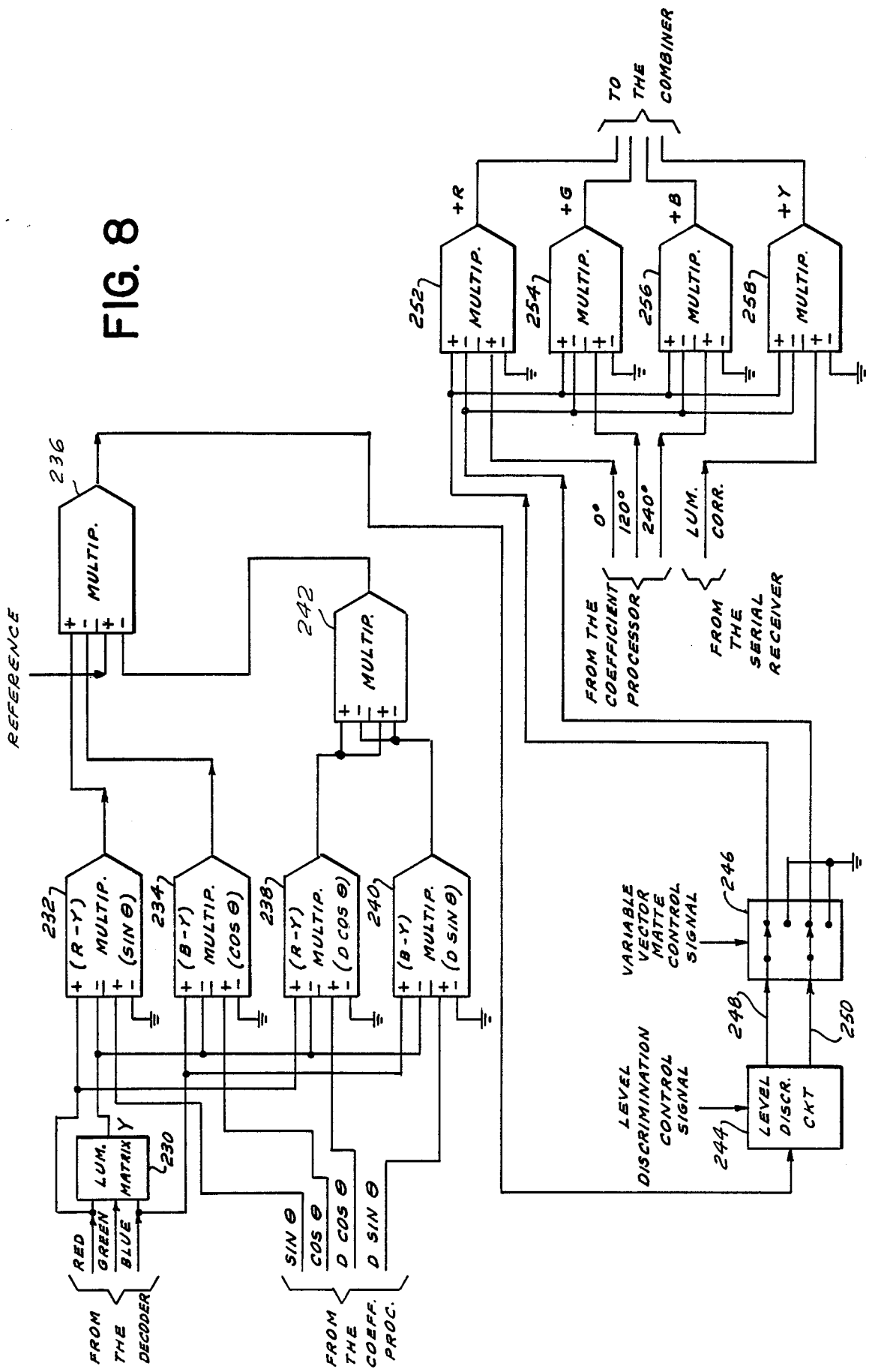

COLOR CORRECTION SYSTEM AND METHOD

This application is a continuation of application Ser. No. 851,164 filed Apr. 14, 1986, now abandoned, which is a continuation-in-part of U.S. patent application Ser. No. 598,468, filed on Apr. 9, 1984, now U.S. Pat. No. 4,679,067.

BACKGROUND OF THE INVENTION

The invention relates to systems and methods for color correcting video picture signals. More particularly, the present invention pertains to improved systems and methods for increasing the quality and speed of color correction operations. This patent describes improvements upon the color correction systems and methods disclosed in U.S. Pat. Nos. 4,096,523 (the "Rainbow" patent); 4,223,343 (the "Anamorphic" patent); 4,410,908 (the "Luminance" patent); copending, commonly owned U.S. patent applications Ser. No. 598,468, U.S. Pat. No. 4,679,067, entitled "Color Correction System and Method With Localized Color Sampling" now U.S. Pat. No. 4,679,067; Ser. No. 722,801, U.S. Pat. No. 4,694,329, entitled "Color Correction System and Method With Scene-Change Detection"; now U.S. Pat. No. 4,694,329 allowed and Ser. No. 807,815, entitled "Editing System and Method" now U.S. Pat. No. 4,750,050. The disclosures of these patents and patent applications are hereby incorporated herein by reference.

There is a continuing need to improve the efficiency, speed, and quality of the color correction of video picture signals, especially in film-to-tape and tape-to-tape transfers, and particularly in scene-by-scene color correction. For instance, there is a need to better isolate particular objects for color correction. Furthermore, there is a need to better select a specific color or a specific range of colors for color correction.

OBJECTS OF THE INVENTION

Accordingly, an object of the invention is to satisfy the above needs and provide a system and method for color correcting video picture signals with increased efficiency, speed, and quality.

Another object of the invention is to provide an apparatus and a method for improving the accuracy with which a specific color or a specific range of colors may be color corrected.

An additional object of the invention is to provide an apparatus and a method for more easily identifying and recalling the color corrections associated with particular scenes in an image recording medium that is to be color corrected.

A further object of the invention is to provide an apparatus and a method for better segregating a particular area of the picture produced by the video picture signals and color correcting this particular area.

Yet another object of the invention is to provide an apparatus and a method for improving the ability to color correct color signals having certain levels.

SUMMARY OF THE INVENTION

The invention satisfies the needs identified above and meets the foregoing objects by providing an apparatus in which a predetermined range of colors around an infinitely variable principal color are selected. Color corrections for the video picture signals corresponding to the predetermined range of colors are selectively developed, and then the color corrections are applied to the video picture signals, thereby producing color corrected video picture signals. Accordingly, any object in the video picture may be selected based upon its color. Preferably, the size of the predetermined range of colors is adjustable. Therefore, all of the colors in the object may be selected for color correction, even if the object consists of a wide range of colors. However, the range may be adjusted to be very narrow, if the operator so desires. Thus, the present invention permits particular objects to be selected for color correction based upon their colors. The principal color may be selected from any hue. This advantage results in an improvement in the quality of the color corrected videotape. Moreover, this advantage decreases the time, and therefore the cost, of color correcting motion picture film and videotape.

In accordance with another aspect of the invention, a color corrector includes circuits for discriminating the video picture signals in a specific area from the video picture signals forming the remainder of the picture. Color correction signals are applied to the video picture signals either inside of or outside of the specific area. The size and/or the position of the specific area may be changed at the beginning of each new scene. Consequently, the area may "follow" a particular object as it moves from place to place in various scenes. Hence, greater object selectivity for color corrections is obtained, and better color corrections are developed.

In accordance with a further aspect of the invention, the color corrections for a particular scene are identified or labeled with a video picture from that particular scene. The video picture is displayed for the operator. The operator may use the display to recall the color corrections for that particular scene and apply them to the video picture signals for the present scene. Several video pictures may be shown on the same display, and the operator may utilize an array of pushbuttons arranged like the video pictures on the screen or a light pen in order to choose the color corrections to be recalled. Alternatively, the display may include a touch screen, and the operator may touch the video picture associated with the desired color corrections in order to recall them. The operator does not have to remember the scene number for the particular scene, which may change as the motion picture film or the videotape is edited. This aspect of the invention enables the operator to readily identify, locate, and recall the color corrections he or she desires to work with. Therefore, this aspect of the invention greatly increases the speed with which a motion picture film or a videotape may be color corrected.

In accordance with an additional aspect of the invention, the color corrector may include circuits for discriminating video picture signals based upon their color levels. Specifically, such discrimination circuits may discriminate signals above a predetermined level or signals below a predetermined level or signals between two predetermined levels. Color corrections are selectively developed for the discriminated signals, and the color corrections are applied to the associated video signals to produce color corrected video picture signals. This aspect of the invention further increases object selectivity and speeds the color correction process.

The features of the invention each increase the efficiency of the color correction process. In addition, when two or more features are used together, even greater efficiency results, such efficiency previously being unattainable.

BRIEF DESCRIPTION OF THE DRAWINGS

The above and other objects, features, and advantages of the present invention will become apparent upon consideration of the following detailed description of illustrative embodiments thereof, especially when taken in conjunction with the accompanying drawings, wherein:

FIGS. 5A-5D are diagrammatic illustrations of waveforms on a vectorscope and depict the functions of the variable vector controls;

FIG. 8 is a block diagram of the variable vector control circuits for a color correction system according to the invention;

DETAILED DESCRIPTION OF THE PREFERRED EMBODIMENTS

General Description

Figure 1:
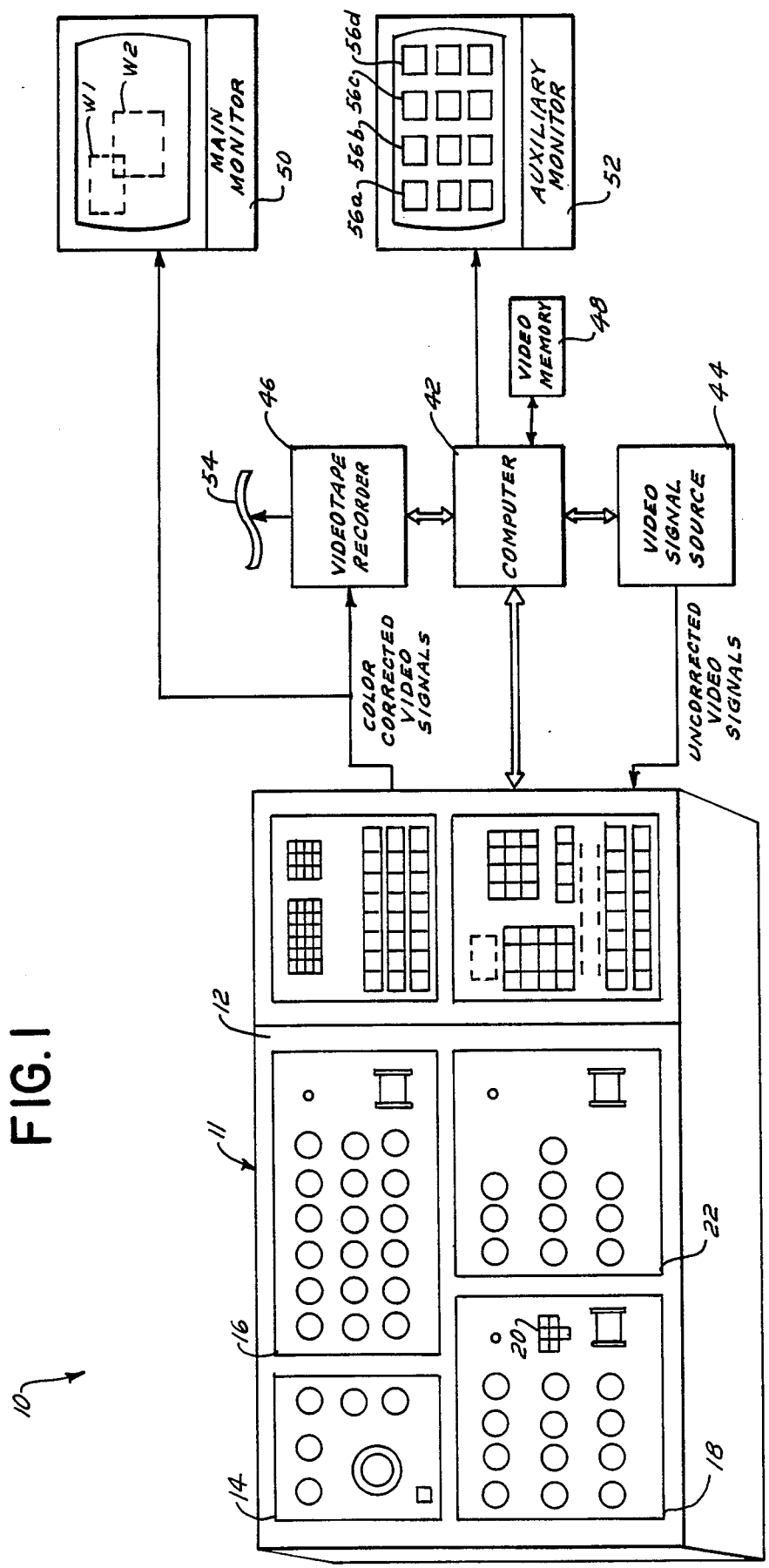
FIG. 1 is a diagrammatic illustration of a color correction system according to the invention.

FIG. 1 shows a color correction system 10 constructed according to the invention. The color correction system 10 includes a color corrector 11 having a front panel 12. Portions of the front panel 12 are illustrated in greater detail in FIGS. 2-4. The front panel 12 has a set of variable vector controls 14 and a set of six vector controls 16. The six vector controls 16 function as outlined in the Rainbow, Anamorphic, and Luminance patents. The front panel 12 includes a set of color balance controls 18 and "window" controls 20. The "window" controls 20 are described and depicted in greater detail in application Ser. No. 598,468 U.S. Pat. No. 4,679,067 as well as application Ser. No. 722,801 U.S. Pat. No. 4,694,329. The front panel 12 additionally includes video signal source controls 22. The video signal source controls 22 adjust parameters such as the PEC gain and negative gain for each of the red, green, and blue channels. Moreover, the video signal source controls adjust other parameters, for instance, the horizontal pan, the vertical pan, the zoom, and the contours. Each of the controls in the sets of controls 14, 16, 18, and 22 includes a control knob which is coupled to a shaft-position encoder, as described in the latter patents (U.S. Pat. No. 4,679,067) (U.S. Pat. No. 4,694,329).

The right side of the front panel 12 includes pushbuttons and displays. Specifically, this portion of the front panel includes two rows of pushbuttons 24, which are shown in greater detail in FIG. 4, and three rows of pushbuttons 26, which are shown in greater detail in FIG. 3. The functions of many of these pushbuttons are described in the Rainbow, Anamorphic, and Luminance patents. A display 28 shows the scene number for the color corrections stored in the A buffer and the B buffer. Moreover, the display 28 shows the scene number for the current scene.

A keypad 30 and a display 32 are used to recall the color corrections for a particular scene and apply them to the present scene. For example, if the operator wanted to use the color corrections for scene number 1,234 for the current scene, the operator would press the "call" pushbutton and then the buttons 1, 2, 3, and 4 of the keypad 30 in this sequence in order to recall the desired color corrections. The right portion of the front panel has an array of pushbuttons 34 and a row of pushbuttons 36 for recalling color correction signals for previous scenes in another manner. The operation of the pushbuttons 34 and 36 will be described at length below. The right portion of the front panel 12 has waveform pushbuttons and indicators 38 for selecting various waveforms for viewing on an oscilloscope (not shown) as well as monitor selector pushbuttons and indicators 40 for selecting various signals for monitoring.

The system 10 has a computer 42, which is connected to each of the color corrector 11, a video signal source 44, a videotape recorder 46, and a video memory 48. The video signal source 44 may be a film chain, a telecine, a videotape player, or the like. The video signal source 44 produces video signals from the associated image recording medium. These video signals are delivered to the color corrector 11 so that they may be corrected. The color corrector 11 provides color corrections for the video signals from the video signal source 44 under the direction of the operator and the computer 42, and it produces color corrected video signals. The color corrected video signals are sent to a videotape recorder 46 and to a main monitor 50. The operator may observe the effect of the color corrections on the video signals by looking at the video picture on the main monitor 50. The videotape recorder 46 records the color corrected video signals on a videotape 54, thereby producing a color corrected videotape.

The main monitor is shown with windows W1 and W2. The use of the windows W1 and W2, which are movable in size and/or position, is described further below.

An auxiliary monitor 52 is connected to the computer 42. The auxiliary monitor 52 displays a plurality of video pictures, such as the video pictures 56a-56d. The function of the auxiliary monitor 52 and the video memory 48 is described below during the discussion of the pushbuttons 34 and 36.

Above each of the control knobs in the sets of controls 14, 16, 18, and 22 is a row 35 of four light-emitting diodes ("LEDs"), which are referred to as rangefinder LEDs. The two inner LEDs are green, while the two outer LEDs are red. When the associated control knob is in its center position, the two inner LEDs are energized. If the control knob is turned to the right, the two inner LEDs are deenergized and the rightmost LED is energized. Correspondingly, if the control knob is turned to the left, the two inner LEDs are deenergized, and the leftmost LED is energized. Accordingly, the operator may quickly determine the position of any of the control knobs.

Reset buttons 64, 66, and 68, are provided to permit the operator to readily center the control knobs in the sets of controls 16, 18, and 22, respectively. Specifically, the operator presses a reset button, and all of the control knobs in the associated set of controls are electronically centered by zeroing the counter connected to the control knob. The controls 16, 18, and 22 include active-memory pushbutton-indicators 70, 72, and 74, respectively.

The "notch" pushbutton sets the scene boundary between scenes. The "color correct enable" pushbutton makes the "notch" pushbutton effective for color correction events. The "pan enable" pushbutton makes the "notch" pushbutton effective for position related events, such as horizontal pans, vertical pans, and zooms.

The carry forward mode is entered by pressing the "carry forward mode" pushbutton. In this mode, the color corrections from the last scene are carried forward for the next scene. That is, once the operator establishes color corrections for a particular scene and then sets the scene boundary between that scene and the next scene, these color corrections are both stored for the particular scene and applied to the next scene. Thus, the operator may use these color corrections as a basis for color correcting the next scene.

The "picture file" pushbutton is used with the video scene recall feature of the invention, which is described below. The "picture file" pushbutton enables the array of pushbuttons 34 and the row of pushbuttons 36.

The "dissolve" pushbutton is used to produce a linear transition between the color corrections for a given scene and the color corrections for the subsequent scene. For example, the operator may make color corrections for a given scene and then make color corrections for the subsequent scene. If the operator wants a smooth transition between scenes, the operator presses the "dissolve" pushbutton at a frame near the end of the given scene and again presses the "dissolve" pushbutton at a frame near the beginning of the subsequent scene. The computer is programmed to automatically provide a linear transition, for instance, on a frame-by-frame basis, between the color corrections for the given scene and the color corrections for the subsequent scene for all frames between the two dissolve points.

Figure 3:
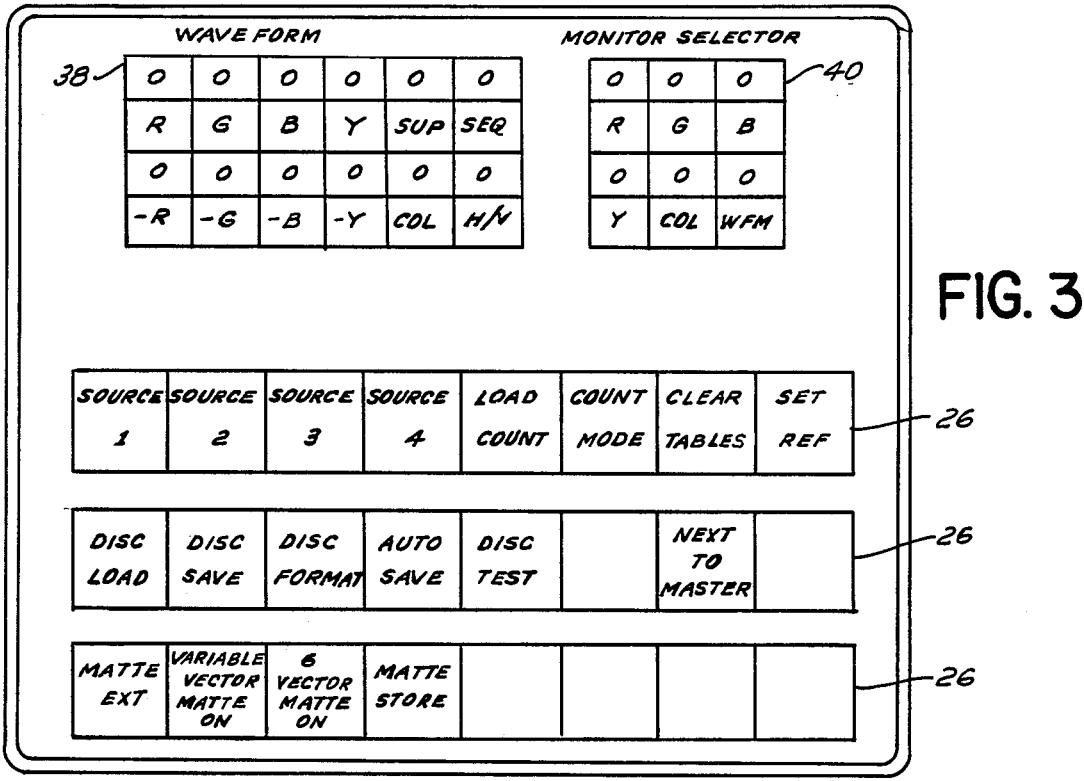
FIG. 3 is an enlarged view of a portion of the front panel shown in FIG. 2.
Figure 4:
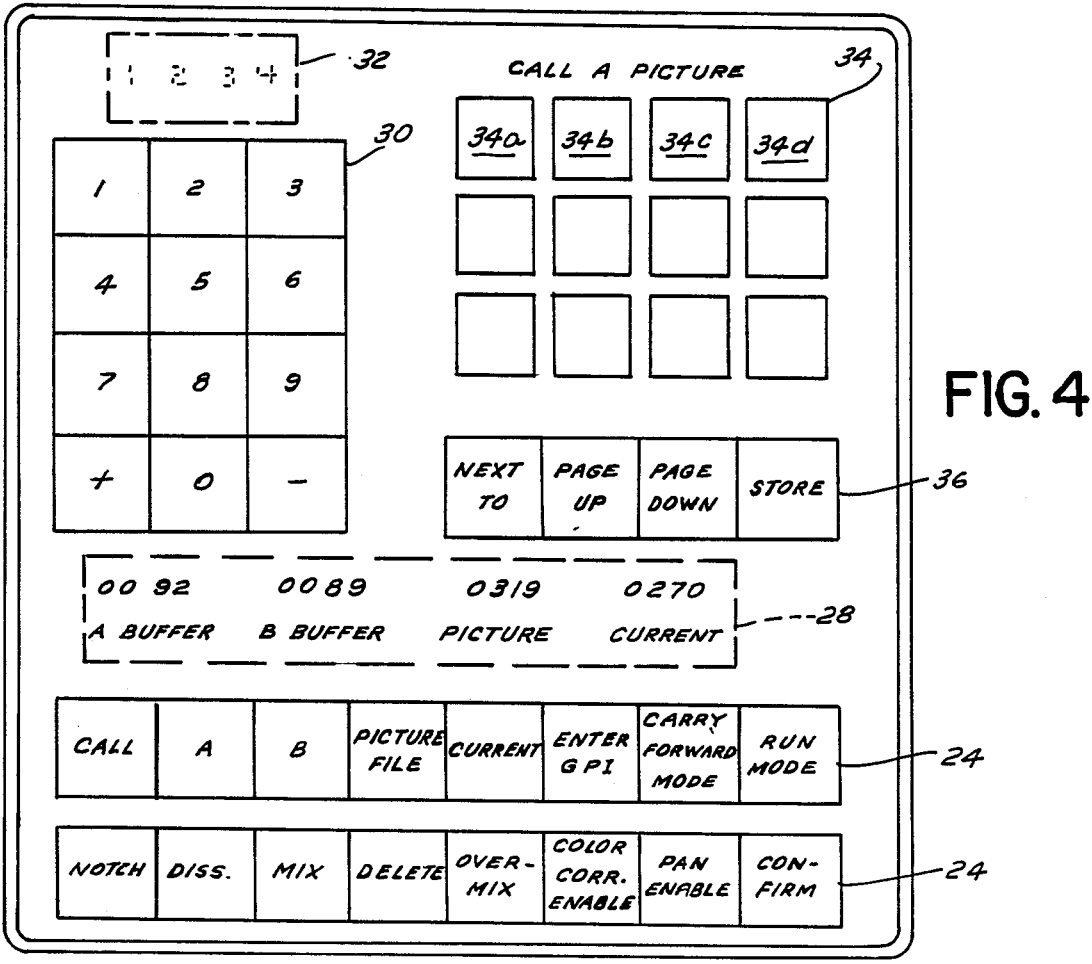
FIG. 4 is an enlarged view of another portion of the front panel shown in FIG. 2.

The "source 1," "source 2," "source 3," and "source 4" pushbuttons, which are shown in FIG. 3, enable the operator to select one of a variety of video signal sources. For example, the operator may select a telecine as the video signal source by pressing the "source 1" pushbutton or select a videotape player as the video signal source by pressing the "source 2" pushbutton.

The "load count" pushbutton allows the frame counter to be initialized to any number at the beginning of a new job. The "count mode" pushbutton allows the operator to select among various counting modes for the frame counter, such as, counts by hours, minutes, seconds and film frames or PAL video frames or NTCS video frames.

The "matte ext," "variable vector matte on," "six vector matte on," and "matte store" pushbuttons are described below during the description of the travelling matte feature of the invention.

The "disc load," "disc save," "disc format," "auto save," and "disc test" pushbuttons are utilized to control an external storage device (not shown) for the computer, such as a floppy disc drive or a hard disc drive.

Variable Vector Controls

Figure 2:
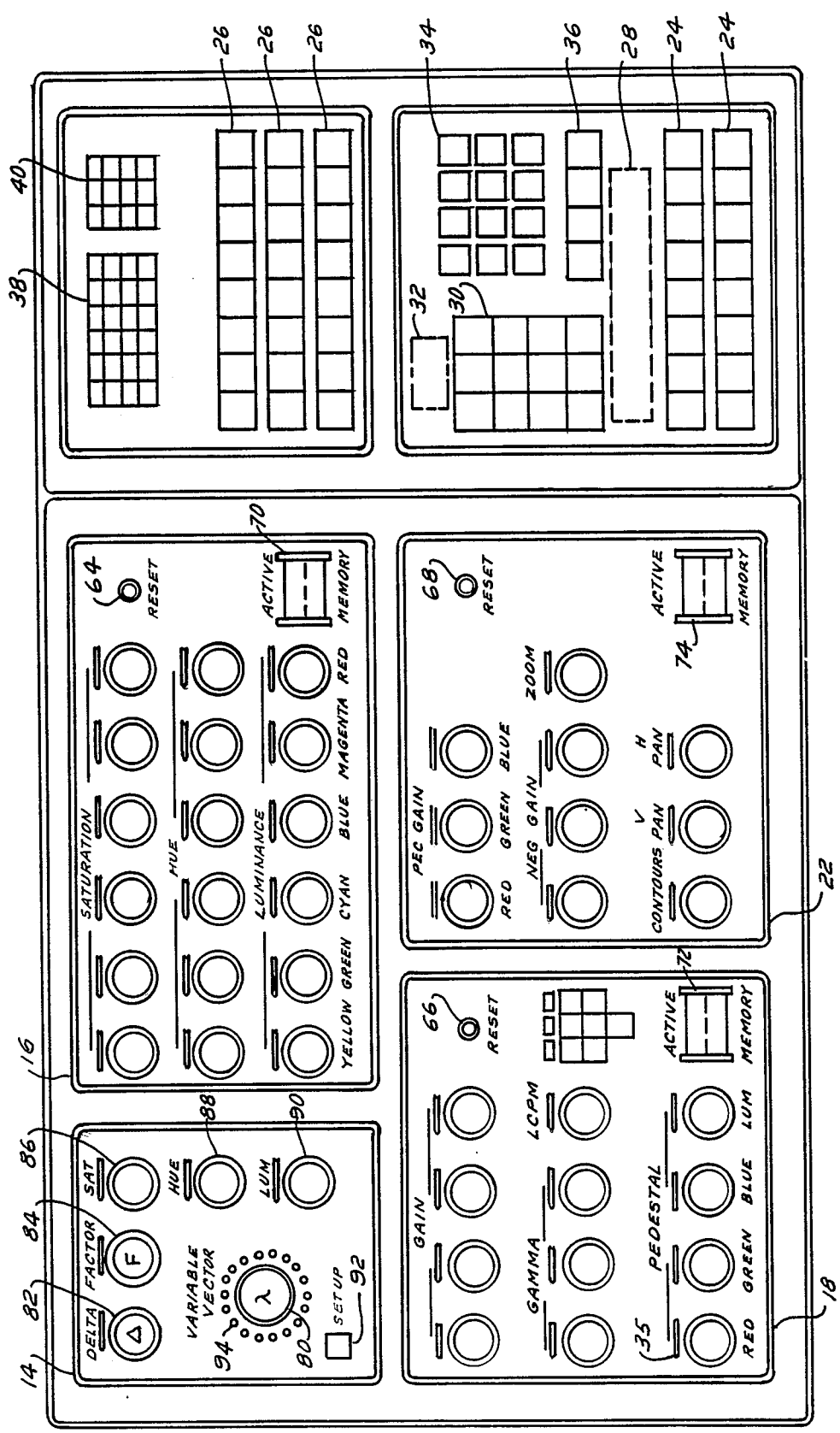
FIG. 2 is a top plan view of the front panel for the color corrector shown in FIG. 1.

FIG. 2 illustrates the set of variable vector controls 14. The controls 14 include a variable vector position control 80, a delta control 82, a factor control 84, a saturation control 86, a hue control 88, and a luminance control 90. Furthermore, the variable vector controls 14 include a "set up" pushbutton, the function of which is described below. A plurality of LEDs 94 are located around the circumference of the variable vector position control 80. The LEDs 94 indicate the angular orientation of the variable vector position control 80. The angular orientation of the variable vector position control 80 corresponds to one of the colors on a vectorscope.

The variable vector position control 80 is used to select a particular range of colors for color correction. The principal color within the range of colors is determined by the angular orientation of the variable vector position control 80. The variable vector position control 80 may be used to select any principal color within the precision of the associated counter. For example, if the associated counter is a 12-bit counter, any one of 4,096 different principal colors may be selected with the variable vector position control 80.

The functions of the various controls 80-90 are better explained in conjunction with FIGS. 5A-5D. The circle 96 diagrammatically illustrates a vectorscope. The waveform 98 illustrates the response of the variable vector control circuits when the input signal to the color corrector is from a device which generates a spectrum of color signals. The waveform 98 corresponds to a given angular orientation of the variable vector position control 80. FIG. 5A shows the effect of turning the variable vector position control 80. For example, if the control 80 is turned clockwise to select a different principal color, the response of the vectorscope becomes the waveform 98a. Then, if the control 80 is turned further clockwise to select another principal color, the response of the vectorscope becomes the waveform 98b. Similarly, if the control 80 is turned counterclockwise to select yet another principal color, the response of the vectorscope becomes the waveform 98c. Accordingly, the control 80 may be turned to select the principal color from any hue.

The variable vector controls are nominally effective for a predetermined range of colors around the principal color. For example, colors within plus or minus 5 degrees of the principal color will be color corrected along with the principal color; however, the effectiveness of the color corrections will decrease as the distance from the principal color increases.

The delta or bandwidth control 82 is provided in order to adjust the width of the predetermined range of colors effected by the variable vector control position control 80. FIG. 5B shows the effect of rotating the delta control 82. The delta control 82 may be rotated clockwise in order to increase the width of the range of colors or rotated counterclockwise in order to decrease the width of the range of colors. Hence, the width of the range of colors may be made as large or as small as the operator desires, within the limits of the equipment. For instance, the width of the range of colors may be changed anywhere from plus or minus about 2 degrees around the principal color to plus or minus 90 degrees around the principal color. FIG. 5B shows a waveform 100 with the same principal color as the waveform 98 but with an increased bandwidth. The waveform 100 was obtained by turning the delta control 82 clockwise. FIG. 5B also shows a waveform 102 with the same principal color as the waveform 98 but with a decreased bandwidth. The waveform 102 was obtained by turning the delta control 82 counterclockwise.

Once the desired principal color and the desired range of colors around it have been selected with the variable vector position control 80 and the delta or bandwidth control 82, the saturation control 86, the hue control 88, and the luminance control 90 may be employed to generate color correction signals for the video picture signals corresponding to the selected range of colors. More particularly, the hue control 88 is used to alter the colors in the selected range of colors and shift them in the color spectrum, while the saturation control 90 is used to change the levels of the colors in the selected range of colors. Additionally, the luminance control 92 is utilized to vary the luminance of the colors in the selected range of colors.

FIG. 5C shows the effect of rotating the hue control 88. To shift the colors in the selected range of colors, the hue control 88 is turned clockwise or counterclockwise. FIG. 5C shows a waveform 104 and a waveform 106. The waveform 104 was produced by turning the hue control 88 clockwise after the waveform 98 was selected. Similarly, the waveform 106 was produced by turning the hue control 88 counterclockwise after the waveform 98 was selected. The hue control may shift the color within the selected range of colors by any desirable amount, within the limits of the equipment. For example, the hue control may be designed to shift the principal color by up to 60 degrees in one direction or the other.

FIG. 5D shows the effect of turning the saturation control 86. The saturation control 86 may be rotated clockwise or counterclockwise to increase or decrease, respectively, the saturation levels of the colors in the selected range of colors. As an example, the waveform 108 illustrates what happens when the saturation control 86 is rotated clockwise once the waveform 98 was selected. The waveform 108 has a saturation level above the waveform 98. The waveform 110 illustrates what happens when the saturation control is rotated counterclockwise once the waveform 98 was selected. The waveform 110 has a saturation level below the waveform 98.

The luminance control 92 may be used to increase or decrease the brightness of the colors within the selected range of colors. Of course, the luminance control 92, the hue control 88, and the saturation control 86 may be employed together to alter the associated parameters of the colors within the selected range of colors. The variable vector control knob 80 and the delta control knob 82 are utilized to set the selected range of colors, as noted above. The factor control 84 is used to select those colors within the selected range of colors that have saturation levels either above or below a specified level. The function of the factor control 84 is described in greater detail below during the description of FIGS. 10 and 11.

As an example of the use of the variable vector controls 14, the color correction of a particular scene will be described. Assume the operator desires to color correct a specific object, such as an apple. The operator initially presses the "set up" pushbutton 92, which is part of the variable vector controls 14. This causes all portions of the picture which have colors within the nominal range of colors set by the variable vector position control 80 to become a neutral gray. If the apple does not become gray, the operator rotates the variable vector position control 80 until the apple becomes gray. If only a portion of the apple becomes gray because the apple contains colors outside of the selected range, the operator rotates the delta control to increase the delta or bandwidth of the selected range until the entire apple becomes gray. This signifies that the colors the operator desires to correct, i.e., the colors forming the apple, are encompassed within the selected range. The operator again presses the "set up" pushbutton 92, and the colors are displayed in an unaltered fashion.

Now, the operator may turn any or all of the saturation control 86, the hue control 88, or the luminance control 90 in order to adjust the corresponding parameter of the colors within the selected range of colors. For instance, the operator may rotate the hue control 88 to change the color of the apple from a greenish red to red. Once the operator has developed the color corrections with the controls 86, 88, and 90, the operator causes the color corrections to be stored in the computer 42. The storage and retrieval of the color corrections may be accomplished as described in the Rainbow patent. The color corrections are read from the memory in the computer and used to produce the color corrected videotape 54 during the run mode.

In this manner, the video picture signals forming the apple may be color corrected to produce a desirable image. With the variable vector controls, the apple may be segregated from any of the other objects in the picture and then color corrected. Accordingly, the variable vector controls permit greater object selectivity during color correction and speed the color correction procedure.

Video Scene Recall Feature

The array of pushbuttons 34 and the row of pushbuttons 36, together with the auxiliary monitor 52, which is shown in FIG. 1, may be used to implement the video scene recall feature of the invention. This feature of the invention enables an operator to readily identify the color corrections for a particular scene with a picture from that scene for later use.

The auxiliary monitor 52 displays up to twelve different video pictures, such as the video pictures 56a-56d. The twelve video pictures are displayed in an array with four columns and three rows. The array of twelve video pictures corresponds to the array of twelve pushbuttons 34. Each video picture is associated with the color corrections for the scene which includes that video picture, and each pushbutton 34 is associated with one of the video pictures. Specifically, the pushbuttons 34a-34d correspond to the video pictures 56a-56d, respectively. The pushbuttons correspond to the video pictures based upon their placement in the associated array.

When the operator desires to recall the color corrections for the scene with the video picture 56b, for example, the operator presses the pushbutton 34b, and those color corrections are recalled and applied to the output of the video signal source 44. The information for producing the video pictures on the auxiliary monitor is stored in the video memory 48. This information is recalled and directed to the auxiliary monitor under the control of the computer 42.

The video scene recall feature of the invention enables the operator to quickly and easily determine and recall particularly useful color corrections. The operator does not have to remember what scene corresponds to the contents of buffer A or what scene corresponds to the contents of buffer B. Moreover, the operator does not have to think of a name for the color corrections for a given scene and type it onto a display. This feature of the invention presents the operator with an easily recognizable label for specific color corrections. Thus, the operator is better able to recall and utilize previous color corrections. As a result, the time necessary for color correcting a videotape is shortened. The video scene recall feature is an alternative to the use of the "call" pushbutton and the keyboard 30 for recalling previous color corrections.

Figure 6:
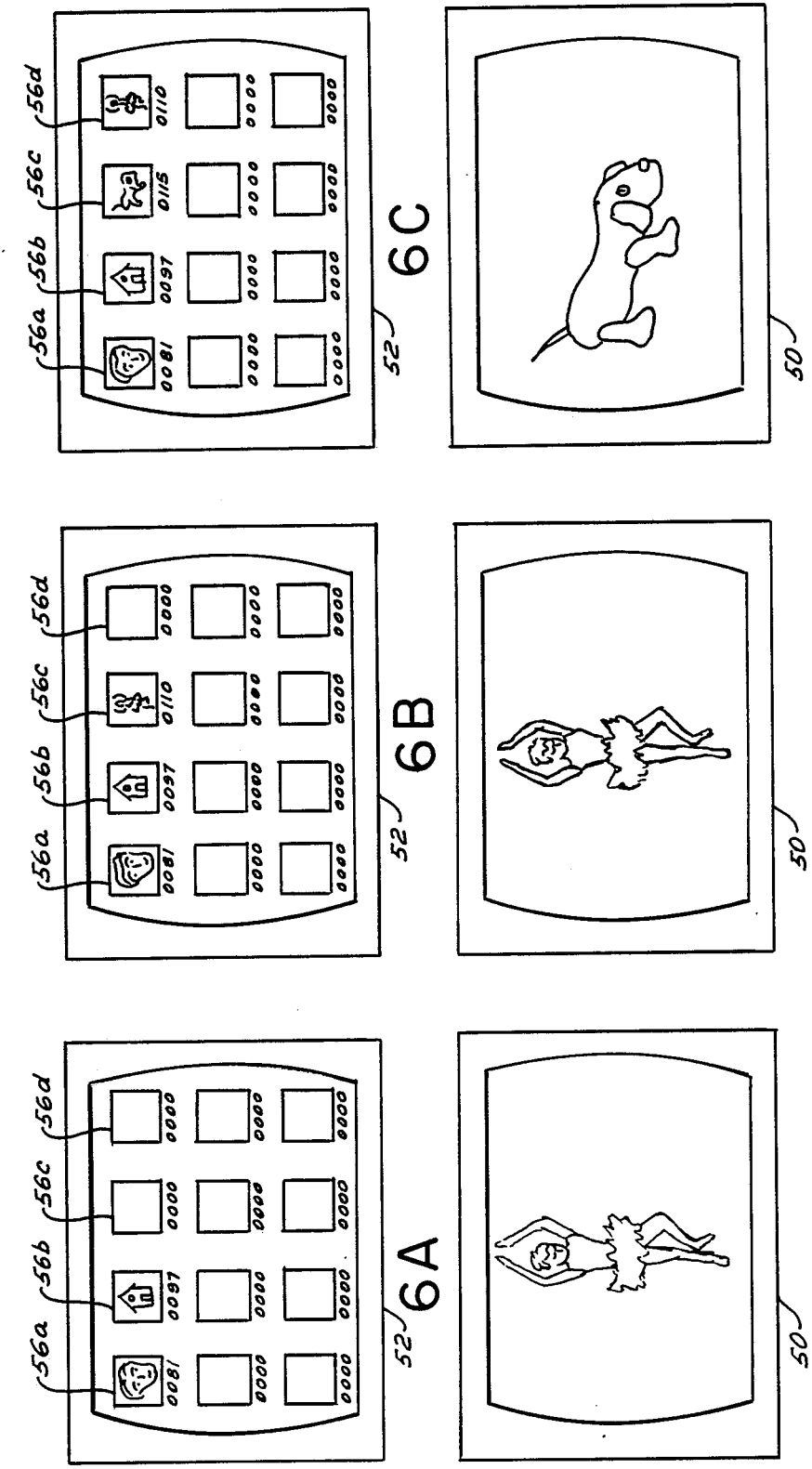
FIGS. 6A-6C are enlarged views of the auxiliary monitor and the main monitor for the color correction system shown in FIG. 1.

FIGS. 6A-6C show the main monitor 50 and the auxiliary monitor 52 on a larger scale. FIG. 6A illustrates the auxiliary monitor 52 after the operator has identified the color corrections for two previous scenes. The operator has used video pictures 56a and 56b for the identification of the color corrections. In particular, the operator has identified the color corrections for scene 0081 with a video picture corresponding to a person's face, and the operator has identified the color corrections for scene 0097 with a video picture corresponding to a house. A different video picture, i.e., a video picture from the current scene, is displayed on the main monitor 50. The operator determines the color corrections for the current scene, as set forth above and in the Rainbow patent, and now wishes to identify those color corrections for later use. The operator simply presses the "store" pushbutton, which is located in the row of pushbuttons 36, and then the operator presses the pushbutton 34c.

FIG. 6B illustrates what happens after the operator presses these pushbuttons. The picture on the main monitor 50 is displayed as the video picture 56c, which corresponds to the pushbutton 34c, and the scene number for the present scene, i.e., 0110, is displayed in the display below the video picture 56c. Now, at any later time the operator may press the pushbutton 34c, and the color corrections for scene 0110 will be recalled and applied to the current scene.

The operator is not required to use the video pictures on the auxiliary monitor 52 and the pushbuttons 34 to identify the color corrections in any specific order. For example, the operator could have pressed the button 34d in order to identify the color corrections for the current scene. If the operator had done so, the video picture of the dancer would have been displayed in location 56d instead of location 56c.

FIG. 6C depicts a variation of the video scene recall feature of the invention. If the operator wishes to compare the color corrections for two given scenes, the operator may press the "next to" pushbutton, which is located in the row of pushbuttons 36. As an example, assume that the operator has identified the color corrections for three scenes as shown by the auxiliary monitor 52 in FIG. 6B and that the operator has pressed the pushbutton 34b to apply the corresponding color corrections to the current scene. Now, the operator desires to compare the color corrections for the current scene, i.e., scene 0115, with the color corrections for scene 0097. The operator simply presses the "next to" pushbutton. The picture of the dog on the main monitor 50 is then displayed next to the picture for scene 0097, and the picture that was in location 56c is automatically moved to location 56d. Consequently, the operator may readily compare the color corrections for scene 0097 with the color corrections for scene 0115. If the operator wishes to examine the color corrections for these two scenes on a larger scale, the operator may use the "next to master" pushbutton, which is shown in FIG. 3, thereby causing the two video pictures to be displayed simultaneously on the master monitor 50.

The video memory 48 contains sufficient storage for the twelve video pictures 56 on the auxiliary monitor 52. If the identification of color corrections for more than twelve scenes is desired, the video memory 48 may contain additional storage for the additional video pictures. That is, the video memory 48 may contain additional pages of memory. In order to move from one page of the video memory, with an associated display of up to twelve video pictures on the auxiliary monitor, to another page of video memory, with a different display of up to twelve video pictures on the auxiliary monitor, the "page up" and "page down" pushbuttons are employed. The "page up" and "page down" pushbuttons are located in the row of pushbuttons 36.

Color Correction Circuit Block Diagram

Figure 7A:
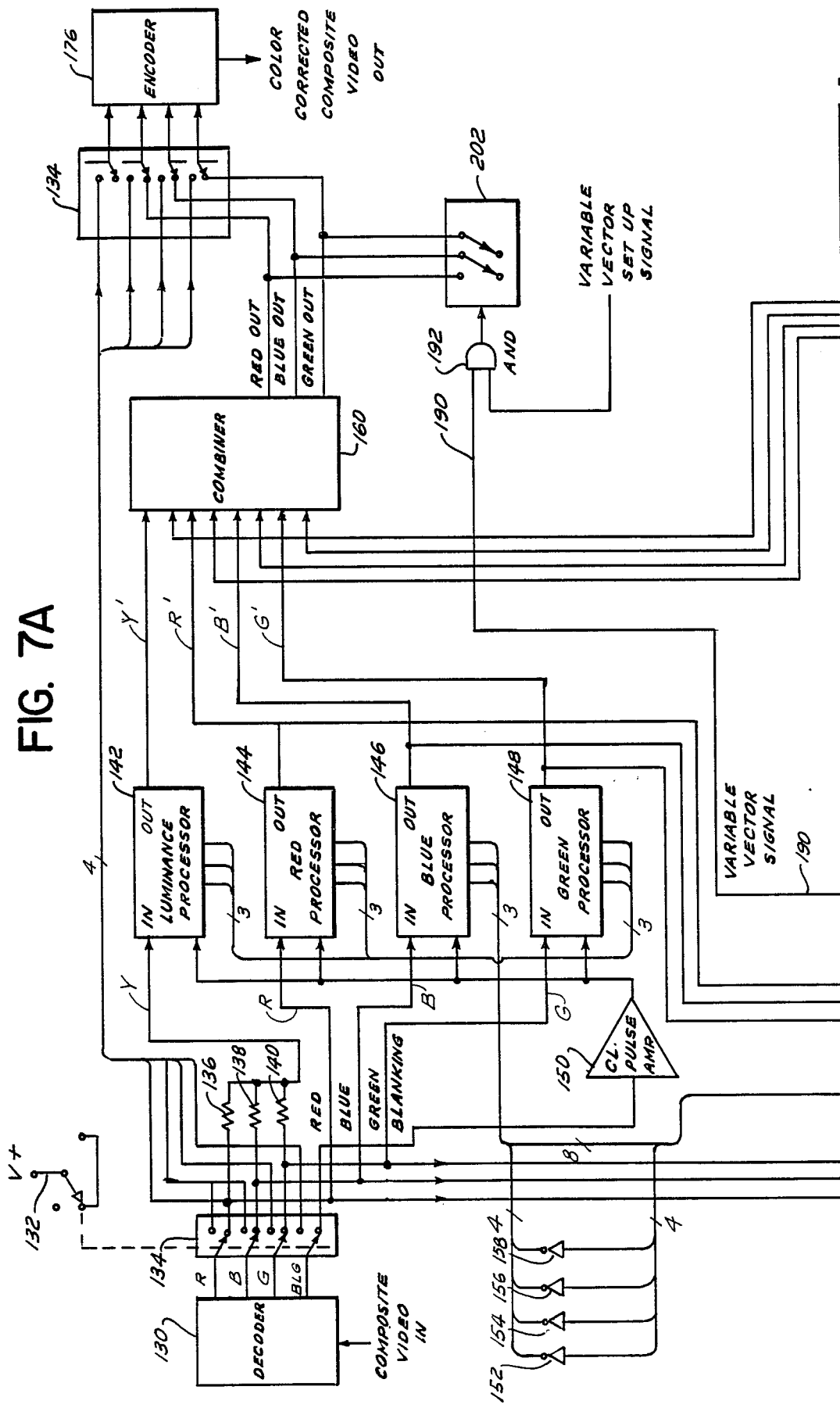
FIGS. 7A-7B are a block diagram of the color correction circuits in a color correction system according to the invention.
Figure 7B:
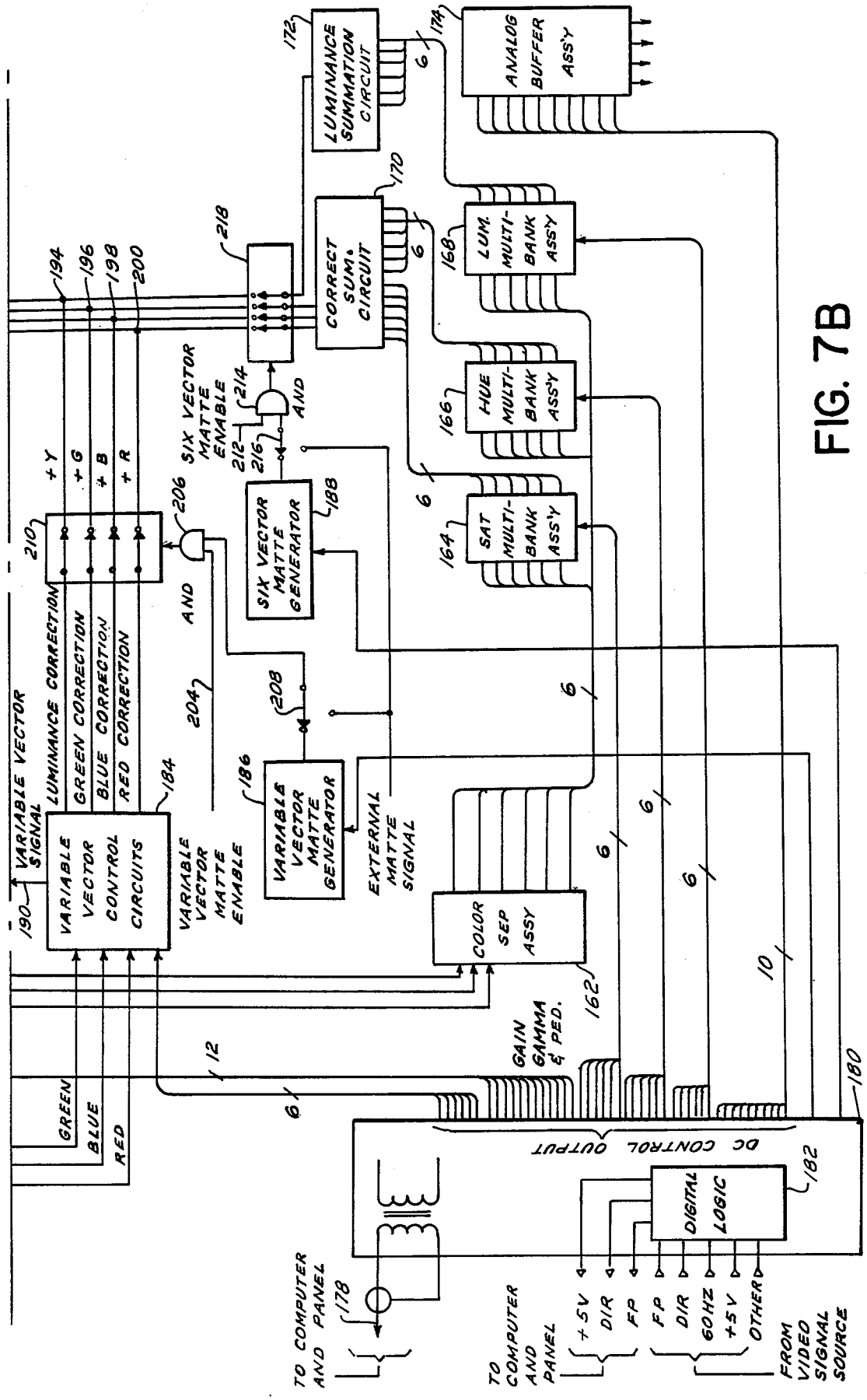

FIGS. 7A and 7B are a block diagram for the color correction circuit of the color corrector 11. The components 130 through 176 are conventional components. The components 130 through 176 and their interconnections are described in detail in application Ser. No. 807,815, now U.S. Pat. No. 4,750,050. Consequently, the description of these components and their interconnections will not be repeated here.

The serial receiver 180 and the digital logic circuits 182 are modified to receive control signals for the variable vector control circuits 184 as well as control signals for the variable vector matte generator 186 and the six vector matte generator 188. The variable vector control circuits 184 are described in greater detail below in connection with the description of FIGS. 8 and 9. The circuits for the variable vector matte generator 186 and the six vector matte generator 188 are shown and described in application Ser. No. 598,468 now U.S. Pat. No. 4,679,067 and application Ser. No. 722,801, now U.S. Pat. No. 4,694,329. Specifically, four programmable counters may be employed for each of the matte generators 186 and 188. The counting information for each of the programmable counters is supplied by the computer 42 over the coaxial cable 178 to the serial receiver 180. The serial receiver then delivers corresponding signals to the matte generator circuits 186 and 188.

The correction summation circuit 170 produces correction signals for the red ("R"), blue ("B"), and green ("G") signals, while the luminance summation circuit 172 generates a correction signal for the luminance ("Y") signal, as described in application Ser. No. 807,815. The magnitudes of the correction signals depend upon the levels of the D.C. signals from the serial receiver 180. Similarly, the variable vector control circuits 184 provide correction signals for the R, B, G, and Y signals. The variable vector control circuits receive D.C. signals from the serial receiver 180. The magnitudes of the correction signals for the R, B, G, and Y signals depend upon the levels of the associated D.C. signals. The correction signals are identified as the +R, +B, +G, and +Y signals in FIGS. 7A and 7B.

The correction signals from the variable vector control circuits 184 are added to the correction signals from the correction summation circuit 170 and the luminance summation circuit 172 at points 194-200. The added correction signals are delivered to the combiner 160, where they are combined with the R, B, G, and Y signals from the processors 142-148 to produce color corrected R, B, and G signals. The color corrected R, B, and G signals are sent from the combiner 160 to an encoder 176, which produces a color corrected composite video signal. The color corrected composite video signal is sent to the main monitor 50 and the video tape recorder 46, as shown in FIG. 1.

The variable vector control circuits 184 output a variable vector signal when the vector determined by the R, B, and G signals at the input is within the range set by the variable vector controls. The variable vector signal is sent over a line 190 to an AND gate 192. The other input to the AND gate 192 is a variable vector set up signal from the "set up" pushbutton 92 on the front panel 12. When the "set up" pushbutton is pressed and the variable vector signal is present, the output of the AND gate 192 becomes HIGH and actuates a switching circuit 202. The switching circuit 202 shorts together the R, B, and G output signals from the combiner 160. Accordingly, a neutral gray is produced as the composite video output of the encoder 176. As a result, the operator may observe on the main monitor 50 which colors are within the range set by the variable vector controls. If the colors the operator wants to correct are not within this range, the operator may adjust the variable vector position control 80, the delta control 82, and/or the factor control 84, as discussed previously.

Travelling Matte Feature

The correction signals from the variable vector control circuits 184, the correction summation circuit 170, and the luminance summation circuit 172 may be applied to the video picture signals for the entire picture. Moreover, the correction signals from the variable vector control circuits 184 may be applied to the video signals in a predetermined area of the video picture which is smaller than the area of the entire picture. Similarly, the correction signals from the correction summation circuit 170 and the luminance summation circuit 172 may be applied to another predetermined area of the video picture which is smaller than the area of the entire picture.

When the operator desires to apply the correction signals from the variable vector control circuits 184 to the video picture signals in only a limited area of the picture, the operator presses the "variable vector matte on" pushbutton (FIG. 3) on the front panel 12, which produces a variable vector matte enable signal on a line 204. The variable vector matte enable signal on the line 204 is delivered to one input of an AND gate 206. The other input of the AND gate 206 is supplied by the variable vector matte generator 186 through a switching circuit 208. Consequently, the output of the variable vector matte generator 186 determines whether the output of the AND gate 206 is HIGH or LOW. If output of the AND gate 206 is HIGH, a switching circuit 210 closed, but if the output of the AND gate 206 is LOW, the switching circuit 210 is open. The switching circuit 210 permits the correction signals from the variable vector control circuits 184 to travel to the combiner 160 only when the output of the AND gate 206 is HIGH. The variable vector matte generator 186 may be programmed to supply a HIGH signal to the input of the AND gate 206 either inside of the associated predetermined area or outside of the associated predetermined area. Therefore, the correction signals from the variable vector control circuits 184 may be applied to the video picture signals either inside of or outside of the specified area.

When the operator desires to apply the correction signals from the correction summation circuit 170 and the luminance summation circuit 172 to the video picture signals in only a limited area of the picture, the operator presses the "six vector matte on" pushbutton (FIG. 3) on the front panel 12, which produces a six vector matte enable signal on a line 212. The six vector matte enable signal on the line 212 is delivered to one input of an AND gate 214. The other input of the AND gate 214 is provided by the six vector matte generator 188 through a switching circuit 216. Consequently, the output of the six vector matte generator 188 determines whether the output of the AND gate 214 is HIGH or LOW. If the output of the AND gate 214 is HIGH, a switching circuit 218 is closed, but if the output of the AND gate 214 is LOW, the switching circuit 218 is open. The switching circuit 218 permits the correction signals from the correction summation circuit 170 and the luminance summation circuit 172 to travel to the combiner 160 only when the output of the AND gate 214 is HIGH. The six vector matte generator 188 may be programmed to supply a HIGH signal to the input of the AND gate 214 either inside of or outside of the associated predetermined area. Thus, the correction signals from the correction summation circuit 170 and the luminance summation circuit 172 may be applied to the video picture signals either inside of or outside of the specified area.

An external matte generator, such as a special effects generator, may be used to determine the window for the correction signals from the variable vector control circuits 184 and/or the window for the correction signals from the correction summation circuit 170 and the luminance summation circuit 172. The external matte generator produces an external matte signal, which is delivered to each of the switching circuits 208 and 216. The external matte signal is enabled by the "matte external" pushbutton (FIG. 3) on the front panel 12. The operator controls the state of the switching circuits 208 and 216 so that the external matte generator supplies a signal to the AND gate 206 and/or the AND gate 214. Thus, the external matte generator may determine a limited area of the picture to be color corrected.

As an example of the foregoing, FIG. 1 shows the outlines of two windows, window W1 and window W2. The correction signals from the variable vector control circuits 184 may be applied to the video picture signals either inside of or outside of the window W1. Correspondingly, the correction signals from the correction summation circuit 170 and the luminance summation circuit 172 may be applied to the video picture signals either inside of or outside of the window W2.

The size and/or the position of each of the windows W1 and W2 may be changed by the operator by using the window controls 20 on the front panel 12. The window controls 20 are described in detail in U.S. Pat. Nos. 4,679,067 and 4,694,329. The windows W1 and W2 may overlap, as depicted in FIG. 1. Signals that determine the size and the position of the windows W1 and W2 may be stored in the computer 42 for each scene, just as signals for determining the color corrections are stored in the computer 42 for each scene. For instance, if each matte generator includes four programmable counters, the count information for each counter may be stored for each scene.

The operator employs the window controls 20 to determine the size and the position of a window. Once the desired window is obtained, the operator presses the "matte store" pushbutton and signals indicative of the size and the position of the window are stored in the computer. The window may be altered for each new scene, if necessary. Accordingly, a window may be placed around an object in a particular scene and color corrections applied within the window using, for example, the variable vector controls. In subsequent scenes, the size and/or the position of the window may be changed to follow the object. Thus, a window may "travel with" the object from scene to scene. This feature of the invention allows greater object selectivity and improves the quality of the final color corrected videotape. Furthermore, this feature of the invention in combination with the variable vector controls permits even greater object selectivity and further improves the quality of the final color corrected videotape.

The computer may be programmed to provide a smooth transition between the window in one scene and the window in another scene. This may be accomplished in much the same manner as the "dissolve" pushbutton is employed to produce a smooth transition between the color corrections in one scene and the color corrections in the following scene. More particularly, each window boundary may be changed on a frame-by-frame basis starting at a frame near the end of one scene and ending at a frame near the beginning of the subsequent scene.

With this travelling matte feature, the precise outlines of an object to be color corrected do not have to be defined in order for color corrections to occur over the selected hue or hues. All that is necessary is that the matte is positioned to include the object.

Block Diagrams for the Variable Vector Control Circuits

Figure 9:
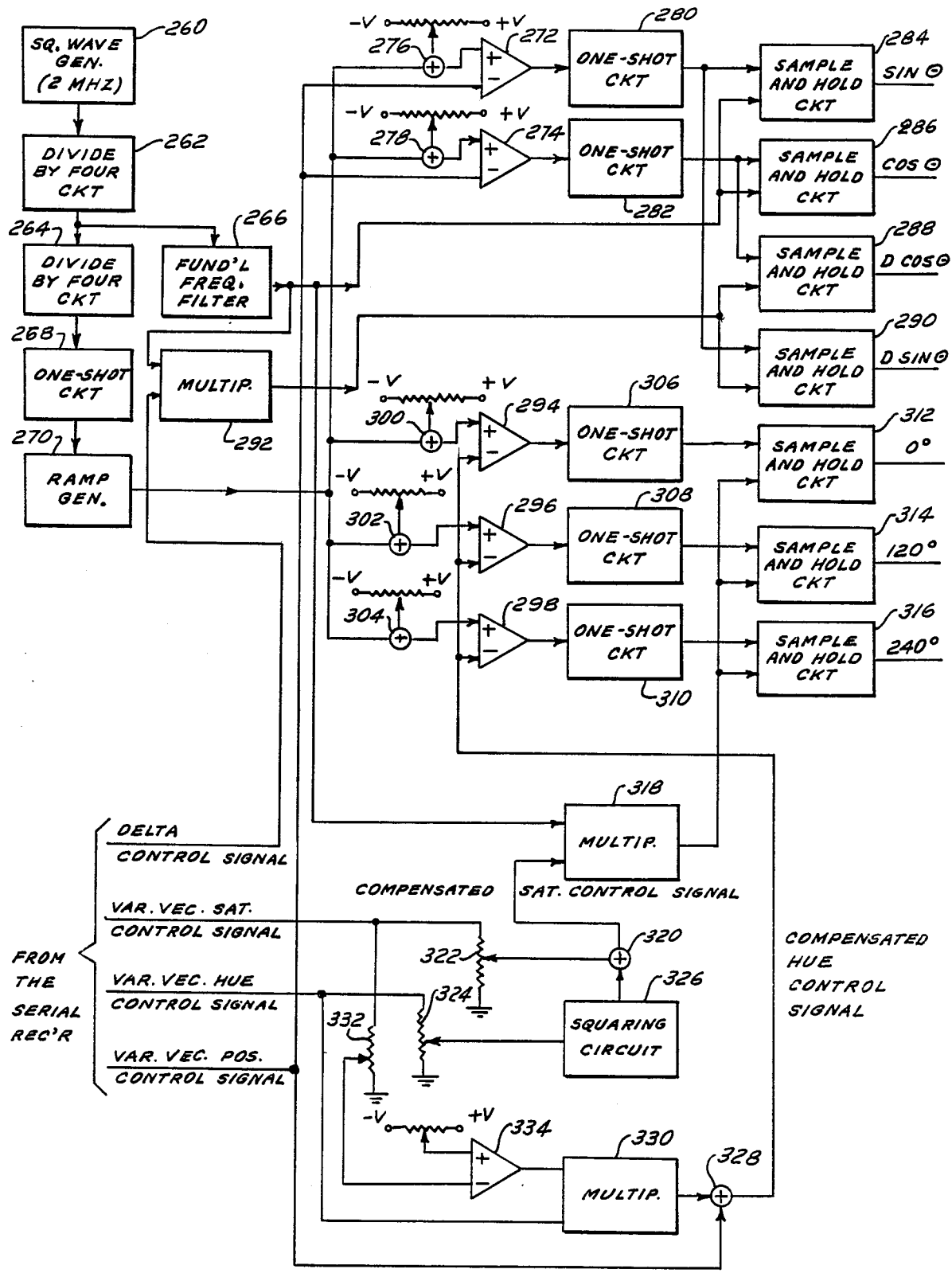
FIG. 9 is a block diagram of a coefficient processor for the variable vector control circuits illustrated in FIG. 8.

FIGS. 8 and 9 are block diagrams for the variable vector control circuits 184 of FIG. 7. In FIG. 8, red ("R"), green ("G"), and blue ("B") signals from the decoder enter a luminance matrix 230 and produce a luminance signal ("Y") at the output of the luminance matrix.

An R-Y signal is one input of a four-quadrant multiplier 232. A B-Y signal is one input of a four-quadrant multiplier 234. The R-Y and B-Y signals are in quadrature. Accordingly, any vector may be selected by taking appropriate portions of the R-Y and B-Y signals. The sin $\theta$ and cos $\theta$ signals from the coefficient processor (shown in detail in FIG. 9) are used to select the appropriate portions of the R-Y and B-Y signals. Other signals which are in quadrature, such as the I and Q signals, may be employed, however. The sin $\theta$ signal is delivered to the other input of the four-quadrant multiplier 232, while the cos $\theta$ signal is supplied to the other input of the four-quadrant multiplier 234. The output signals from the four-quadrant multipliers 232 and 234 determine the principal color in the range of colors set by the variable vector position control.

The range around this principal color is, however, relatively large. Consequently, the four-quadrant multipliers 238, 240, and 242 are employed to narrow the range. The R-Y signal is one input of the four-quadrant multiplier 238, and the B-Y signal is one input of the four-quadrant multiplier 240. A Dcos $\theta$ signal is the other input of the four-quadrant multiplier 238, and a Dsin $\theta$ signal is the other input of the four-quadrant multiplier 240. The Dcos $\theta$ signal is like the cos $\theta$ signal except that the amplitude is changed by the value D. Similarly, the Dsin $\theta$ signal is like the sin $\theta$ signal except that the amplitude is changed by the value D. The output signals from the four-quadrant multipliers 238 and 240 determine a vector which is in quadrature with the vector determined by the output signals from the four-quadrant multipliers 232 and 234.

The vector determined by the output signals from the four-quadrant multipliers 238 and 240 is squared by a four-quadrant multiplier 242 in order to eliminate any negative portions of it. The difference between the output signal from the four-quadrant multiplier 242 and a reference signal is one input of a four-quadrant multiplier 236. The other input of the four-quadrant multiplier 236 is the difference between the output signals from the four-quadrant multipliers 232 and 234. Consequently, the output signal from the four-quadrant multiplier 242 modifies the vector determined by the output signals from the four-quadrant multipliers 232 and 234. In particular, the output signal from the four-quadrant multiplier 242 narrows the range around the principal color. The value D determines the width of the range around the principal color. By changing the value D, the magnitude of the output signal from the four-quadrant multiplier 242 is changed, and a larger or smaller amount is subtracted from the reference signal at the input of the four-quadrant multiplier 236. An explanation of how the value D is obtained is included below during the description of the coefficient processor.

Figure 10:
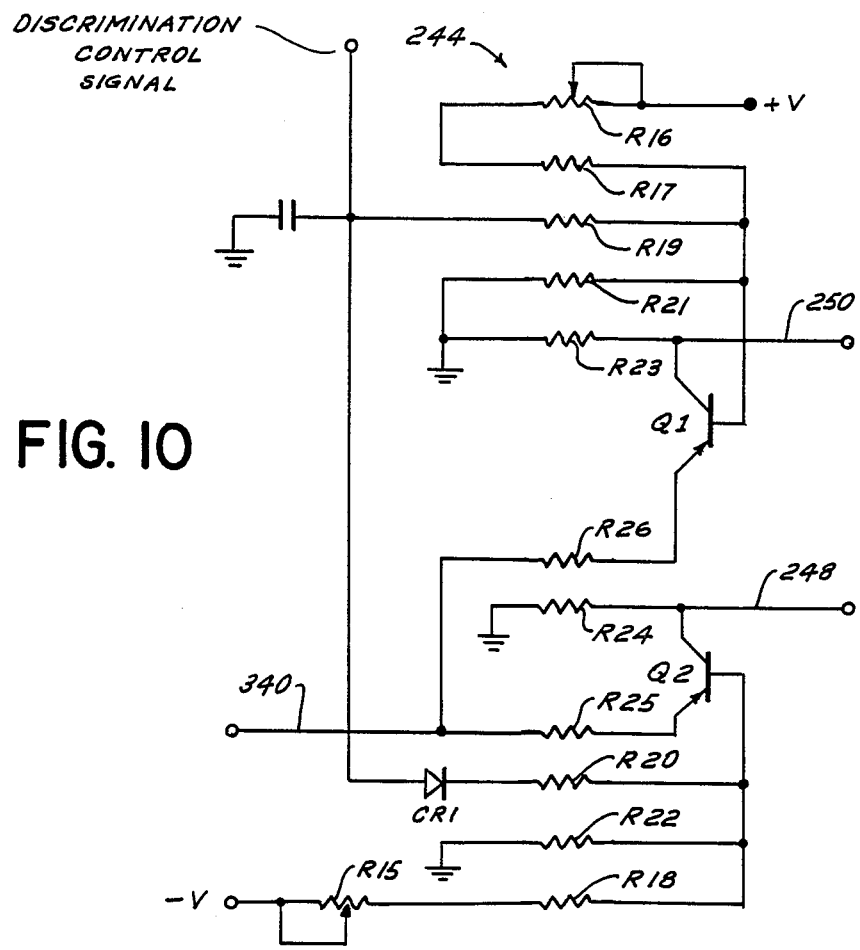
FIG. 10 is a schematic diagram for the level discrimination circuit illustrated in FIG. 8.
Figure 11A:
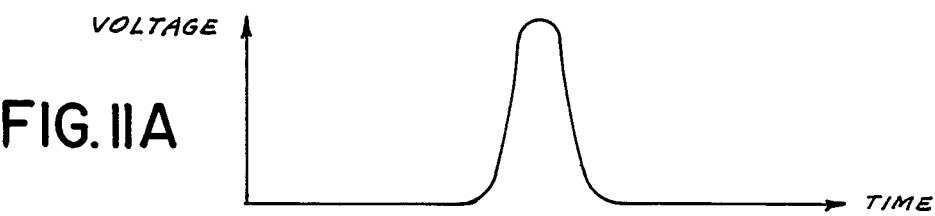
FIGS. 11A-11C are waveform diagrams for the level discrimination circuit illustrated in FIG. 10.
Figure 11B:
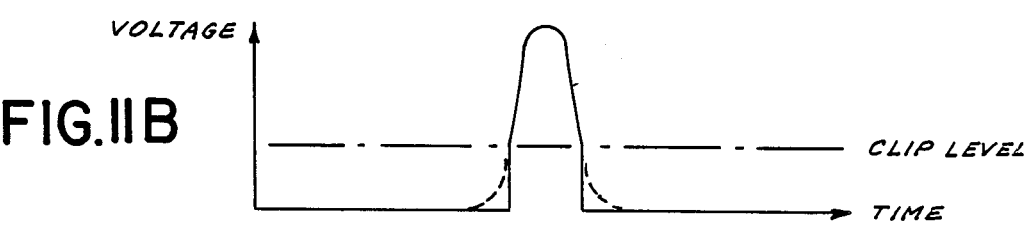
Figure 11C:
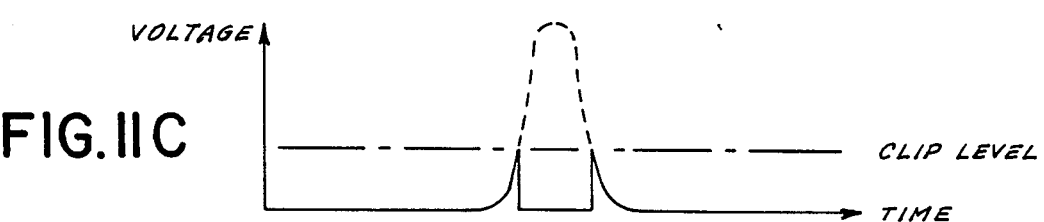

The output signal from the four-quadrant multiplier 236 is sent to a level discrimination circuit 244. The level discrimination circuit 244 is shown in FIG. 10 and described in greater detail below. In short, the level discrimination circuit 244 discriminates signals above a first preset level from signals below the first preset level, and it discriminates signals above a second preset level from signals below the second preset level. Signals above the first preset level are supplied over a line 248 to each of the four-quadrant multipliers 252, 254, 256, and 258. Furthermore, signals above the second preset level are delivered over a line 250 to each of the four-quadrant multipliers 252, 254, 256, and 258.

The difference between the signal on the line 248 and the signal on the line 250 is used as one input of each of the four-quadrant multipliers 252, 254, 256, and 258. The other input of the four-quadrant multipliers 252, 254, and 256 is provided by the coefficient processor, while the other input of the four-quadrant multiplier 258 is supplied by from the serial receiver 180 (FIG. 7B). The coefficient processor delivers signals identified as 0°, 120°, and 240°. These signals resolve the variable vector signal into components corresponding to the R, G, and B signals. The signal from the serial receiver is a luminance correction signal, which corresponds to the position of the variable vector luminance control 90 (FIG. 2) on the front panel 12. This correction signal produces a luminance correction ("+Y") at the output of the four-quadrant multiplier 258. The luminance correction is delivered to the combiner 160, as illustrated in FIGS. 7A and 7B.

FIG. 8 depicts an alternative location for the circuit which controls the variable vector window. Namely, a switching circuit 246 is located between the level discrimination circuit 244 and the four-quadrant multipliers 252-258. The switching circuit 246 receives a variable vector matte control signal, such as the output signal from the AND gate 206 (FIG. 7B), which controls whether the +R, +G, +B, and +Y correction signals will be supplied to the combiner 160 (FIG. 7A). In the position shown in FIG. 8, the correction signals will be sent to the combiner 160. In the other position, the output signals from the discrimination circuit 244 on the lines 248 and 250 are grounded. Consequently, no +R, +G, +B, and +Y signals are developed at the outputs of the four-quadrant multipliers 252–258 and no such correction signals are provided to the combiner 160 when the switching circuit 246 is in its other position.

FIG. 9 is a block diagram of the coefficient processor. The delta control signal, the variable vector saturation control signal, the variable vector hue control signal, and the variable vector position control signal are supplied to the coefficient processor by the serial receiver 180. Each signal corresponds to the position of the associated control on the front panel 12, or an associated signal from the memory in the computer. Specifically, variable vector position control signal corresponds to the position of the variable vector position control 80; the delta control signal corresponds to the position of the delta control 82; the variable vector saturation control signal corresponds to the position of the saturation control 86; and the variable vector hue control signal corresponds to the position of the hue control 88. These signals are employed with the circuits shown in FIG. 9 to produce the sin $\theta$, cos $\theta$, Dcos $\theta$, Dsin $\theta$, 0°, 120°, and 240° output signals from the coefficient processor.

The coefficient processor includes a square wave generator 260, which produces a 2-MHz square wave signal. The 2-MHz signal from the square wave generator 260 is sent to a divide-by-four circuit 262. The output of the divide-by-four circuit 262 is sent to another divide-by-four circuit 264 and to a fundamental frequency filter 266. The output signal from the divide-by-four circuit 264 is delivered to a one-shot circuit 268, which triggers a ramp generator 270. The output signal from the fundamental frequency filter 266 is a 500-KHz sine wave, while the output signal from the ramp generator is a ramp. The ramp extends for four cycles of the 500-KHz sine wave.

In order to develop the sin $\theta$ and cos $\theta$ signals, the variable vector position control signal is compared to two different reference signals at the comparators 272 and 274. The variable vector position control signal is delivered to the minus input of each of the comparators 272 and 274. The plus inputs of the comparators 272 and 274 are supplied by the summation circuits 276 and 278, respectively. The summation circuit 276 adds the ramp signal to a reference signal, while the summation circuit 278 adds the ramp signal to a different reference signal. The two different reference signals are selected to correspond to a difference of 90 degrees along the 500-KHz sine wave. Accordingly, the output signals from the comparators 272 and 274 change from positive to negative at points 90 degrees apart along the sine wave produced by the fundamental frequency filter 266.

The output signals from the comparators 272 and 274 trigger the one-shot circuits 280 and 282, respectively. The one-shot circuits 280 and 282, in turn, trigger the sample-and-hold circuits 284 and 286, respectively. The sample-and-hold circuits 284 and 286 sample the 500-KHz sine wave from the fundamental frequency filter 266. Because the reference signals at the summation circuits 276 and 278 were set to correspond to a 90-degree difference, the sample-and-hold circuits 284 and 286 sample the 500-KHz sine wave at points which are 90 degrees apart. As a result, the sample-and-hold circuits 284 and 286 output signals which have a phase difference of 90 degrees, and these signals are referred to as sin $\theta$ and cos $\theta$.

The variable vector position control signal determines when the outputs of the comparators 272 and 274 change from positive to negative. Consequently, the variable position control signal determines the sin $\theta$ and cos $\theta$ signals, and thereby sets the principal color in the range of colors selected by the variable vector controls.

The sample-and-hold circuits 288 and 290 operate similarly to the sample-and-hold circuits 284 and 286 in order to determine the Dcos $\theta$ and Dsin $\theta$ signals. However, the sample-and-hold circuits 288 and 290 do not sample the 500-KHz sine wave from the output of the fundamental frequency filter 266. Rather, the sample-and-hold circuits 288 and 290 sample the output signal from a multiplier 292. One input of the multiplier 292 is the 500-KHz sine wave from the fundamental frequency filter 266, while the other input of the multiplier 292 is the delta control signal. Accordingly, the output signal from the multiplier 292 is a 500-KHz sine wave which has its amplitude modified by the delta control signal.

When the one-shot circuits 280 and 282 trigger the sample-and-hold circuits 284 and 286, the one-shot circuits 280 and 282 simultaneously trigger the sample-and-hold circuits 288 and 290. Thus, the sample-and-hold circuits 288 and 290 sample a 500-KHz sine wave whose amplitude has been modified by the delta control signal to produce the Dcos $\theta$ and Dsin $\theta$ signals, respectively. The delta control signal, therefore, determines the value D, which sets the width of the range of colors around the principal color.

The comparators 294–298, the summation circuits 300–304, the one-shot circuits 306–310, and the sample-and-hold circuits 312–316 operate like the circuits described above to produce the 0°, 120°, and 240° output signals. However, the sample-and-hold circuits 312–316 do not sample the 500-KHz sine wave from the output of the fundamental frequency filter 266. Instead, the sample-and-hold circuits 312–316 sample the output of the multiplier 318, which is also a 500-KHz sine wave. The 500-KHz sine wave output of the multiplier 318 is derived from the 500-KHz sine wave output of the fundamental frequency filter 266. One input of the multiplier 318 is the 500-KHz sine wave from the fundamental frequency filter 266. The other input of the multiplier 318 is a compensated saturation control signal. The compensated saturation signal modifies the amplitude of the 500-KHz sine wave from the fundamental frequency filter 266 to produce the output signal for the multiplier 318.

The compensated saturation control signal is developed at the output of the summation circuit 320. One input of the summation circuit 320 is provided by the potentiometer 322, which delivers a portion of the variable vector saturation control signal to the summation circuit 320. In order to generate the other input for the summation circuit 320, a portion of the variable vector hue control signal is supplied by a potentiometer 324 to a squaring circuit 326. The squaring circuit 326 squares the input signal and delivers an output signal to the summation circuit 320. The output of the summation circuit 320 is a saturation control signal which has been corrected for changes in the hue control signal. Therefore, the hue of the variable vector may be changed without altering the saturation of the variable vector.

The sample-and-hold circuits 312-316 sample a 500-KHz sine wave whose amplitude has been modified by the compensated saturation control signal, as noted above. The one-shot circuits 306-310 trigger the sample-and-hold circuits 312-316, respectively, and the one-shot circuits 306-310 are triggered when the output signals from the comparators 294-298, respectively, change from negative to positive. The plus inputs of the comparators 294-298 are supplied by the summation circuits 300-304, respectively. One input of each of the summation circuits 300-304 is supplied by the ramp generator 270, while the other input is a reference signal. The reference signals for the summation circuits 300-304 are set so that the sample-and-hold circuits 312-316 sample the output of the multiplier 318 at points which are 120 degrees apart along the associated sine wave. The minus inputs of the comparators 294-298 are provided with a compensated hue control signal.

The compensated hue control signal is developed at the output of a summation circuit 328. One input of the summation circuit 328 is the variable vector position control signal, and the other input the summation circuit 328 is from a multiplier 330. A portion of the variable vector saturation control signal is sent by a potentiometer 332 to the minus input of a comparator 334. The plus input of the comparator 334 is a reference signal. The difference between the reference signal and the portion of the variable vector saturation control signal is delivered to one input of the multiplier 330. The variable vector hue control signal is furnished for the other input of the multiplier 330. Accordingly, the multiplier 330 produces as an output a hue control signal which has been corrected for changes in the saturation control signal. Thus, the saturation of the variable vector may be changed without altering the hue of the variable vector.

The output signal from the multiplier 330 is sent to one input of the summation circuit 328. The summation circuit 328 adds this signal to the variable vector position control signal and delivers its output signal to the minus inputs of the comparators 294-298. Consequently, the ramp-plus-reference signals at the outputs of the summation circuits 300-304 are compared to the compensated hue control signal. The compensated hue control signal corresponds to the position of the hue corrected variable vector. The ramp-plus-reference signals are used to resolve the hue corrected variable vector signal into its R, G, and B components.

The ramp-plus-reference signals together with the summation circuits 300-304, the comparators 294-298, the one-shot circuits 306-310, and the sample-and-hold circuits 312-316 cause the 0°, 120°, and 240° signals to be 120 degrees from one another since reference signals are set appropriately. Hence, the hue corrected variable vector signal may be resolved into its R, G and B components. The compensated saturation control signal varies the amplitude of the sine wave sampled by the circuits 312-314. Thus, the compensated saturation control signal changes the magnitudes of the 0°, 120°, and 240° signals to provide a correction for the saturation level of the variable vector signal.

Level Discrimination Circuit

FIG. 10 is a schematic diagram for the level discrimination circuit 244 shown in FIG. 8. The signal from the output of the four-quadrant multiplier 236 enters the level discrimination circuit 244 on a line 340. This signal travels through a resistor R26 to the emitter of a transistor Q1 and through a resistor R25 to the emitter of a transistor Q2. The base of the transistor Q1 is biased by the potentiometer R16 and the resistors R17, R19, R21, and R23 to prevent the conduction of all signals from the emitter to the collector when the discrimination control signal is zero or positive. The base of the transistor Q2 is biased by the potentiometer R15 and the resistors R18, R20, R22 and R24 to permit the conduction of all signals from the emitter to the collector if the discrimination control signal is zero. A diode CR1 prevents the bias of the transistor Q2 from being changed by the discrimination control signal when the discrimination control signal is negative.

The bias for the transistor Q1 establishes one discrimination or clip level, and the bias for the transistor Q2 establishes another discrimination or clip level. The level set by the bias circuit for the transistor Q1 is higher than the level set by the bias circuit for the transistor Q2. Signals below the associated clip level are prevented from passing to the output, while signals above the associated clip level are passed to the output.

If the discrimination control signal is zero, the transistor Q1 passes no signals because the associated clip level is relatively high, and the transistor Q2 passes all positive signals because the associated clip level is zero. Accordingly, the signal on line 248 minus the signal on line 250 has a waveform like that shown in FIG. 11A when the input signal to the color correction circuit is provided by a device which generates a spectrum of color signals.

As the discrimination control signal becomes increasingly positive from zero, the clip levels associated with the transistors Q1 and Q2 increase. The transistor Q1 passes no signals because the associated clip level is even higher than it was for a zero discrimination control signal. The transistor Q2 passes only signals above the associated clip level. Consequently, the signal on line 248 minus the signal on line 250 has a waveform like that shown in FIG. 11B. The clip level for the transistor Q2 is determined by the discrimination control signal, which affects the bias of the transistor Q2 through the resistor R20.

As the discrimination control signal becomes increasingly negative from zero, the clip level associated with the transistor Q1 decreases, but the clip level associated with the transistor Q2 remains at zero due to the diode CR1. The transistor Q1 passes only signals above the associated clip level. The transistor Q2 passes all positive signals. As a result, the signal on line 248 minus the signal on line 250 has a waveform like that shown in FIG. 11C. The clip level for the transistor Q1 is determined by the discrimination control signal, which affects the bias of the transistor Q1 through the resistor R19.

The sign and the magnitude of the discrimination control signal may be adjusted by the operator with the factor control 84 (FIG. 2) on the front panel 12 of the color corrector 11. For instance, a clockwise rotation of the factor control 84 may correspond to a positive discrimination control signal, and a counterclockwise rotation of the factor control 84 may correspond to a negative discrimination control signal. The amount of rotation, clockwise or counterclockwise, sets the magnitude of the discrimination control signal.

The factor control 84 and the level discrimination control circuit 244 provide the operator with greater selectivity for the color correction of particular objects.

For instance, if two objects in the video picture are approximately the same color, but one has a relatively high saturation level and the other has a relatively low saturation level, the operator may select one of the objects to receive color corrections by suitably adjusting the factor control 84. The video picture signals for the other object will not receive the color corrections. More specifically, the operator may distinguish a light blue sky from a dark blue shirt with the factor control 84 even though these two objects have the same hue. Then, color corrections may be developed for the selected object. Because of this ability, the overall quality of the color corrected videotape is improved since the operator may develop color corrections not previously possible.

Other Variations

Even though the color corrector 11 is shown with one set of variable vector controls, the color corrector may be equipped with two or more sets of variable vector controls. Accordingly, two or more principal colors may be selected, one principal color by each set of variable vector controls. In fact, a color corrector may have a sufficient number of variable vector controls to allow the elimination of the six vector controls.

While the level discrimination circuit is shown and described in connection with the variable vector control circuit, one or more of the color correction circuits for red, green, blue, magenta, yellow, and cyan may be furnished with such a level discrimination circuit.

The coefficient processor is illustrated and explained with analog signal processing circuits, but a suitably programmed general purpose computer or microprocessor may be employed in lieu of the analog signal processing circuits. In addition, digital circuits may be used for other components in the variable vector control circuits.

Although particular illustrative embodiments of the present invention have been described herein with reference to the accompanying drawings, the present invention is not limited to these particular embodiments. Various changes and modifications may be made thereto by those skilled in the art without departing from the spirit or scope of the invention, which is defined by the appended claims.

We claim:

1. Apparatus for color correcting video picture signals, said apparatus comprising, in combination:
    hue detector means that generates output signals only when the input signals represent a selected band of hues, the amplitude of said output signals representing the saturation of the input signals;
    means for varying the location of said band in the spectrum of hues;
    means for selectively developing correction signals for the video picture signals corresponding to said selected band of hues; and
    correcting means for applying the correction signals to the latter video picture signals.

2. Apparatus as in claim 1, including means for adjusting the width of said band of hues.

3. Apparatus as in claim 1 in which said means for varying the location of said band is adapted to vary said location infinitely throughout said spectrum.

4. Apparatus as in claim 1, wherein the correction signal developing means includes means for discriminating from the video picture signals corresponding to said selected band of hues those video picture signals having a saturation level within a predetermined range of saturation levels, and means for developing correction signals for the signals having a saturation which falls within said predetermined range.

5. Apparatus as in claim 4 in which said predetermined range is selected from the group consisting of; above a first adjustable level; below a second adjustable level; and between two adjustable levels.

6. Apparatus as in claim 1 in which said video picture signals correspond to recorded images forming a program sequence, and including memory means for storing color correction and color correction location signals, and means for reading out of said memory means said color correction and location signals and applying the color correction signals so read out to video picture signals under the control of said location signals for the preparation of a color-corrected recording of said program sequence.

7. Apparatus as in claim 1 including window generator means for generating signals to form a window around a selected area of a video display displaying a video picture composed of video picture signals to be corrected, means for varying the size and location of said window on said display, and means for disabling said correcting means in one of the areas inside or outside of said window.

8. A color correcting device comprising, in combination; means for color correcting selected video picture signals corresponding to a selected band of hues, and hue detector means that generates output signals only when the input signals represent a selected band of hues, the amplitude of said output signals representing the saturation of the input signals; said hue detector means including means for developing a first signal and a second signal, said first and second signals being spaced apart 90° in the hue circle; first modifying means responsive to a sin $\theta$ signal for modifying the sign and magnitude of said first signal; second modifying means responsive to a cos $\theta$ signal for modifying the sign and magnitude of said second signal; third modifying means responsive to a D cos $\theta$ signal for modifying the sign and magnitude of said first signal; fourth modifying means responsive to a D sin $\theta$ signal for modifying the sign and magnitude of said second signal; combining means responsive to the square of the difference between the third and fourth modified signals for combining the first modified signal and the second modified signal to limit the operation of said color correcting means to signals within said selected band of hues, wherein said combining means forms the product $$[A^*\sin\theta - B^*\cos\theta]^*[1-(A^*D\cos\theta - B^*D\sin\theta)^2]$$

wherein A represents said first signal and B represents said second signal.

9. Apparatus as in claim 8, including means for varying the angle $\theta$ to select the location of said band of hues in the color spectrum.

10. Apparatus as in claim 8, including means for varying the value of D in order to adjust the width of said band.

11. Apparatus for color correcting selected hues in video picture signals, said apparatus comprising, in combination, hue detector means that generates output signals only when the input signals represent a selected band of hues, the amplitude of said output signals representing the saturation of the input signals, means for delivering said video picture signals to said hue detector means; means for varying the location of said band in the spectrum of hues; width control means for varying the width of said band and adapted for limiting said width to a relatively narrow band; and correction means for developing correction signals to correct the detected signals.

12. A device as in claim 11 in which said video signals include red (R), green (G), and blue (B) component signals, and a luminance (Y) signal, means for forming the signals (R-Y) and (B-Y), and means for modulating said R-Y signal with a signal corresponding to sine $\theta$ and modulating said (B-Y) signal with a signal corresponding to cos $\theta$; where $\theta$ is a predetermined phase angle, subtracting the latter modulation product from the former modulation product, forming signals proportional to D(R-Y) cos $\theta$ and D(B-Y) sin $\theta$, where D is a width factor, adding the latter signals together and rectifying the result, subtracting the result of the rectifying operation from a reference signal and multiplying that result times the result of subtracting the two modulation products from one another, said width control means comprising means for varying the value of D.

13. A device as in claim 12 in which said means for varying the locations of said band comprises means for pre-selecting the angle $\theta$.

14. Apparatus as in claim 13 in which said means for pre-selecting the angle $\theta$ comprises a single rotary potentiometer.

15. Apparatus as in claim 11, said correction means comprising means for adjusting at least one of the hue, saturation and luminance parameters of the detected signals.

16. A method for color correcting video picture signals corresponding to recorded images, said method comprising the steps of:

providing hue detector means that generates an output signal only when the input signals represent a selected band of hues, the amplitude of said output signal representing the saturation of the input signals, the location of said band in the color spectrum being variable;

setting said location of said band in said color spectrum to correspond to the hue of an image to be corrected, selectively developing correction signals for the ones of said video picture signals corresponding to the selected band of hues; and applying the correction signals to the latter video picture signals.

17. A method as in claim 16, wherein the developing step includes discriminating from the video picture signals corresponding to the selected band of hues those video picture signals having a saturation level within a predetermined range of levels and developing correction signals for the signals falling within said range of levels.

18. A method as in claim 16 including providing memory means and control means for controlling the sequential display of pictures corresponding to said picture signals to stop the sequential display, color correcting the picture while it is displayed in still form, storing in said memory means the location of the corrections in said sequence as well as correction information, and replaying said sequence while applying said correction information to the video signals of the pictures being re-played and recording the resulting color-corrected signals on a record medium.

19. A method as in claim 16 including selectively controlling the width of said band in said spectrum to limit or enlarge the portion of a video picture in which signals are detected.

* * * * *